United States Patent
Haberman et al.

(10) Patent No.: US 10,667,021 B2
(45) Date of Patent: *May 26, 2020

(54) DYNAMIC CONTENT ALLOCATION AND OPTIMIZATION

(71) Applicant: Visible World, LLC, Philadelphia, PA (US)

(72) Inventors: Seth Haberman, New York, NY (US); Robert Bress, New Providence, NJ (US); Claudio Marcus, Andover, NH (US)

(73) Assignee: Visible World, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/279,759

(22) Filed: Feb. 19, 2019

(65) Prior Publication Data

US 2019/0320240 A1    Oct. 17, 2019

Related U.S. Application Data

(63) Continuation of application No. 15/180,360, filed on Jun. 13, 2016, now Pat. No. 10,250,952, which is a
(Continued)

(51) Int. Cl.
*H04N 21/81* (2011.01)
*H04N 21/45* (2011.01)
(Continued)

(52) U.S. Cl.
CPC ....... *H04N 21/812* (2013.01); *G06Q 30/0241* (2013.01); *G11B 27/10* (2013.01);
(Continued)

(58) Field of Classification Search
CPC ........... H04N 21/812; H04N 21/44204; H04N 21/8456; H04N 21/4532; H04N 21/25883;
(Continued)

(56) References Cited

U.S. PATENT DOCUMENTS 7,406,434 B1    7/2008  Chang et al.
9,369,777 B2 *  6/2016  Haberman ........... H04N 21/812
(Continued)

FOREIGN PATENT DOCUMENTS

JP    2002-150107 A    5/2002
JP    2008-527930      7/2008
(Continued)

OTHER PUBLICATIONS

English translation of Notice of Grounds for Rejection dated Apr. 10, 2017 in Japanese patent application JP 2014-556676; 3 pages.
(Continued)

*Primary Examiner* — Junior O Mendoza
(74) *Attorney, Agent, or Firm* — BakerHostetler

(57) ABSTRACT

Systems and methods for the optimized allocation of content within a universe of inventory are described. For example, a method may include receiving content comprising at least one characteristic and at least one goal. A universe of inventory may be accessed that comprises a plurality of targets which may be assigned into a plurality of segments based on at least one demographic vector. An allocation optimization model may be generated based on the at least one content characteristic, the at least one goal and the plurality of segments. The content may be presented to the targets based on the allocation optimization model. Viewing data may be received that comprises data associated with target consumption of the content and the allocation optimization module may be re-optimized based on the viewing
(Continued)

data. Additional factors, such as resource constraints and/or filtering rules, may be used when re-optimizing the allocation optimization module.

20 Claims, 10 Drawing Sheets

Related U.S. Application Data continuation of application No. 13/762,115, filed on Feb. 7, 2013, now Pat. No. 9,369,777.

(60) Provisional application No. 61/595,889, filed on Feb. 7, 2012, provisional application No. 61/596,460, filed on Feb. 8, 2012.

(51) Int. Cl.
    *G06Q 30/02*     (2012.01)
    *G11B 27/10*     (2006.01)
    *H04N 21/258*     (2011.01)
    *H04N 21/442*     (2011.01)
    *H04N 21/845*     (2011.01)

(52) U.S. Cl.
CPC . *H04N 21/25883* (2013.01); *H04N 21/44204* (2013.01); *H04N 21/4508* (2013.01); *H04N 21/4532* (2013.01); *H04N 21/8456* (2013.01)

(58) Field of Classification Search
CPC . H04N 21/4508; G11B 27/10; G06Q 30/0241
See application file for complete search history.

(56) References Cited

U.S. PATENT DOCUMENTS

| | | | |
|---|---|---|---|
| 10,250,952 B2* | 4/2019 | Haberman | H04N 21/812 |
| 2003/0070167 A1 | 4/2003 | Holtz et al. | |
| 2003/0149937 A1 | 8/2003 | McElfresh et al. | |
| 2005/0039206 A1 | 2/2005 | Opdycke | |
| 2005/0039260 A1 | 2/2005 | Tyler | |
| 2006/0041480 A1 | 2/2006 | Briggs | |
| 2006/0224447 A1 | 10/2006 | Koningstein | |
| 2006/0287915 A1 | 12/2006 | Boulet et al. | |
| 2007/0168254 A1 | 7/2007 | Steelberg et al. | |
| 2008/0040742 A1 | 2/2008 | Howcroft et al. | |
| 2008/0249834 A1 | 10/2008 | Zigmond et al. | |
| 2008/0281627 A1 | 11/2008 | Chang et al. | |
| 2009/0100459 A1 | 4/2009 | Riedl et al. | |
| 2009/0106089 A1 | 4/2009 | Parkes et al. | |
| 2009/0204479 A1 | 8/2009 | Wolinsky et al. | |
| 2009/0216621 A1 | 8/2009 | Anderson et al. | |
| 2010/0100419 A1 | 4/2010 | Natoli et al. | |
| 2010/0191558 A1 | 7/2010 | Chickering et al. | |
| 2010/0313218 A1 | 12/2010 | Niemeijer et al. | |
| 2011/0208580 A1 | 8/2011 | Wolinsky | |
| 2011/0288907 A1 | 11/2011 | Harvey et al. | |
| 2012/0059719 A1 | 3/2012 | Ajima | |
| 2012/0116873 A1 | 5/2012 | Damm et al. | |
| 2013/0014153 A1 | 1/2013 | Bhatia et al. | |
| 2014/0236729 A1* | 8/2014 | Sidi | G11B 27/10 705/14.58 |

FOREIGN PATENT DOCUMENTS

| | | |
|---|---|---|
| JP | 2008-535094 | 8/2008 |
| JP | 2010-500646 | 1/2010 |
| JP | 2010-524352 | 7/2010 |
| JP | 2010-170528 A | 8/2010 |
| WO | 2012/001807 A1 | 1/2012 |

OTHER PUBLICATIONS

Extended European Search Report and European Search Opinion, dated Aug. 14, 2015, from Corresponding European Patent Application No. 13746646.2.

International Search Report and The Written Opinion of the International Searching Authority, dated Apr. 23, 2013, from foreign application PCT/US13/25169, International filing Date Feb. 7, 2013.

* cited by examiner

DYNAMIC CONTENT ALLOCATION AND OPTIMIZATION

CROSS-REFERENCE TO RELATED APPLICATIONS

This application is a continuation of U.S. application Ser. No. 15/180,360, filed Jun. 13, 2016, which is a continuation of U.S. application Ser. No. 13/762,115, filed Feb. 7, 2013, now U.S. Pat. No. 9,369,777, issued Jun. 14, 2016, which claims the benefit of U.S. Provisional Application Nos. 61/595,889, filed on Feb. 7, 2012, and 61/596,460, filed on Feb. 8, 2012, the contents of all of which are incorporated by reference in their entireties as if fully set forth herein.

FIELD OF INVENTION

The present invention generally relates to the allocation of content within a universe of available inventory, and more specifically to optimizing the allocation of content based on objectives of content providers and the progress of the objectives based on recipient interaction with the content.

BACKGROUND

Purchasers of advertising space, for example television advertisements, typically place advertisements according to a media plan. Media buyers attempt to place advertisements based on fairly broad demographics, such as gender, age, employment, income or other definable groups which may be associated with measured television program or commercial ratings. For example, media buyers may develop media plans to place their advertisements in an inventory of advertising slots during television programs in order to reach a certain portion of a target demographics. However, conventional media campaigns are subject to certain inefficiencies, because the broad demographics inaccurately map to actual audiences that consume the content and due to an inability to reliably determine the progress of an active campaign. As such, a media campaign using traditional techniques is not able to dynamically optimize content distribution to content targets based on accurate, substantially real-time data.

SUMMARY

This disclosure is not limited to the particular systems, devices and methods described, as these may vary. The terminology used in the description is for the purpose of describing the particular versions or embodiments only, and is not intended to limit the scope.

In an embodiment, a system for optimizing content allocation may comprise a processor and a non-transitory, computer-readable storage medium in operable communication with the processor. The computer-readable storage medium may contain one or more programming instructions that, when executed, cause the processor to: receive content comprising at least one characteristic and at least one goal; access a universe of inventory comprising a plurality of targets; assign the plurality of targets into a plurality of segments based on at least one demographic vector; generate an allocation optimization model based on the at least one content characteristic, the at least one goal and the plurality of segments; present the content to the plurality of targets based on the allocation optimization model; receive viewing data comprising data associated with target consumption of the content; and re-optimize the allocation optimization module based on the viewing data.

In an embodiment, a computer-implemented method for optimizing content allocation may comprise, by a processor: receiving content comprising at least one characteristic and at least one goal; accessing a universe of inventory comprising a plurality of targets; assigning the plurality of targets into a plurality of segments based on at least one demographic vector; generating an allocation optimization model based on the at least one content characteristic, the at least one goal and the plurality of segments; presenting the content to the plurality of targets based on the allocation optimization model; receiving viewing data comprising data associated with target consumption of the content; and re-optimizing the allocation optimization module based on the viewing data.

In an embodiment, a computer program product comprising a non-transitory computer-readable medium having control logic stored therein causing a computer to optimize the allocation of content, the control logic comprising: computer-readable program code configured to receive content comprising at least one characteristic and at least one goal; computer-readable program code configured to access a universe of inventory comprising a plurality of targets; computer-readable program code configured to assign the plurality of targets into a plurality of segments based on at least one demographic vector; computer-readable program code configured to generate an allocation optimization model based on the at least one content characteristic, the at least one goal and the plurality of segments; computer-readable program code configured to receive at least one resource constraint; computer-readable program code configured to present the content to the plurality of targets based on the allocation optimization model; computer-readable program code configured to receive viewing data comprising data associated with target consumption of the content, data associated with target consumption of the content comprising viewer impressions of the content; computer-readable program code configured to re-optimize the allocation optimization module based on the viewing data; and computer-readable program code configured to update a progress of the at least one goal based on the viewing data as filtered by the at least one filtering rule.

DETAILED DESCRIPTION

Figure 1:
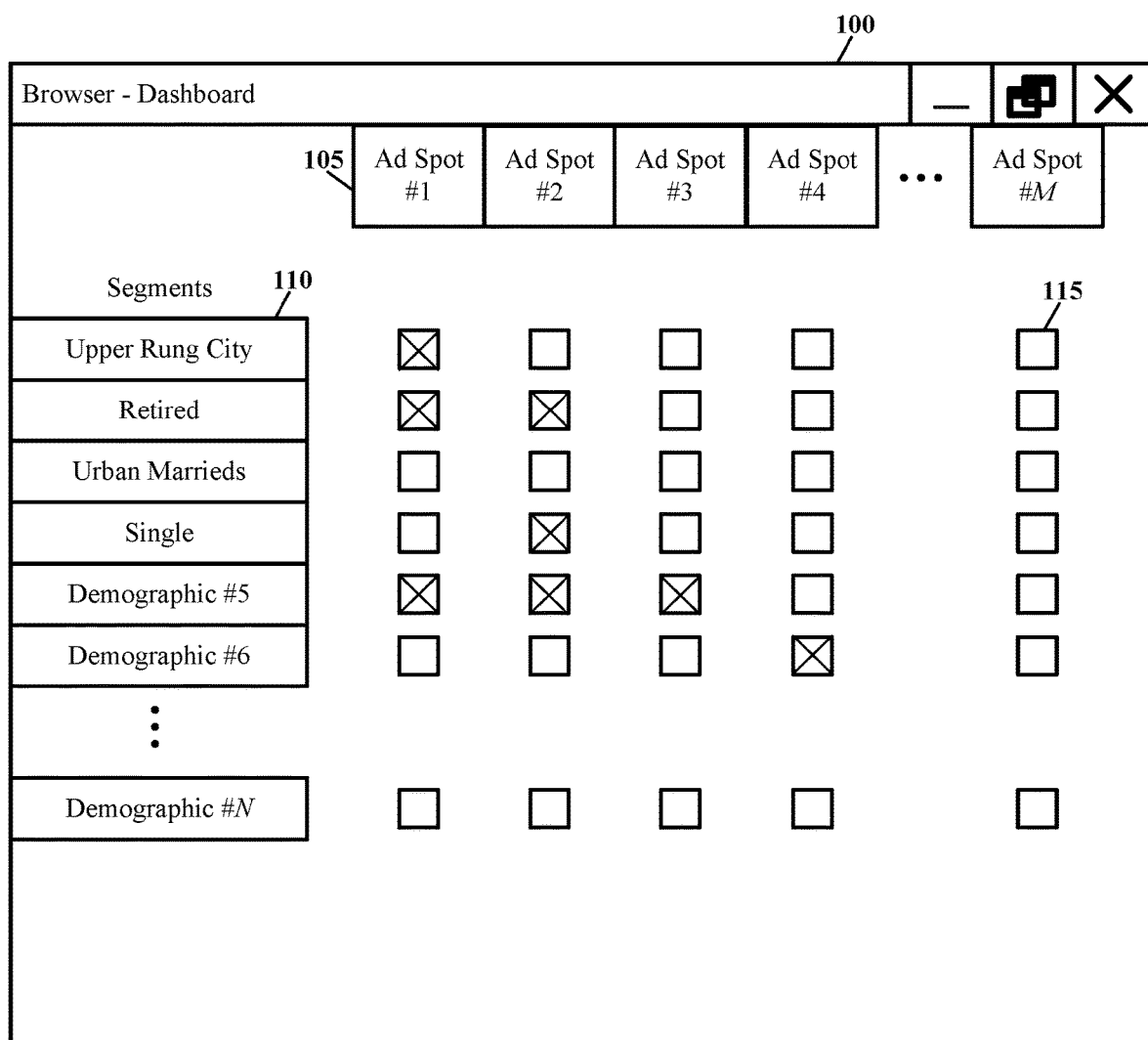
FIG. 1 depicts an illustrative user interface for associating spots with particular demographic groups according to some embodiments.

Throughout this disclosure, where compositions are described as having, including, or comprising specific components, or where processes are described as having, including or comprising specific process steps, it is contemplated that compositions of the present teachings also consist essentially of, or consist of, the recited components, and that the processes of the present teachings also consist essentially of, or consist of, the recited process steps.

In this disclosure, where an element or component is said to be included in and/or selected from a list of recited elements or components, it should be understood that the element or component can be any one of the recited elements or components and can be selected from a group consisting of two or more of the recited elements or components. Further, it should be understood that elements and/or features of a composition, an apparatus, a system, and/or a method described herein can be combined in a variety of ways without departing from the spirit and scope of the present teachings, whether explicit or implicit herein.

The use of the terms "include," "includes," "including," "have," "has," or "having" should be generally understood as open-ended and non-limiting unless specifically stated otherwise. As used in this document, the term "comprising" means "including, but not limited to."

The use of the singular herein includes the plural (and vice versa) unless specifically stated otherwise. Moreover, the singular forms "a," "an," and "the" include plural forms unless the context clearly dictates otherwise. In addition, where the use of the term "about" is before a quantitative value, the present teachings also include the specific quantitative value itself, unless specifically stated otherwise. As used herein, the term "about" refers to a ±10% variation from the nominal value.

It should be understood that the order of steps or order for performing certain actions is immaterial so long as the present teachings remain operable. Moreover, two or more steps or actions may be conducted simultaneously.

The terminology used in the description is for the purpose of describing the particular versions or embodiments only, and is not intended to limit the scope.

A media buyer may have one or more products or brands, with associated target demographics, as well as a set of goals for this specific campaign/plan. Goals are typically expressed as a combination of budget ($ cost) and a certain reach and frequency of exposure to a campaign or commercial. The buyer then will try to meet, or get as close as possible to, the reach goal while attempting to stay within budget. The buyer will look at ratings data, inventory pricing, and commercial or TV spot rotations, and will try to come up with the optimal allocation of inventory against the goals. Buyers may perform this process for a single product with a single TV spot, or for a single product with multiple TV spots (with different target demo audiences for example), or for multiple products (each with one or more spots), or even for multiple advertisers (with one or more spots each). Such buyers may buy large broad reach TV media (for example national or regional distribution) and may not be able to differentiate within the footprint (the only way to presently fine-tune campaigns using multiple spots to target demographics may be through managing rotations or manually specifying specific spots to air with specific networks, day-parts or programs).

The present disclosure relates generally to systems and methods for optimizing the placement of content within available inventory. In particular, embodiments provide for a content optimization system configured to optimize the allocation of content to recipients based on one or more factors, including, without limitation, demographic vectors, population segment characteristics, goals, feedback, resource constraints, resource values, filtering rules, substantially real-time and/or historical viewing data, or a combination thereof.

Although advertisers and advertising content may be used in examples in this disclosure, embodiments are not so limited, as any type and form of content capable of operating according to embodiments is contemplated herein. Non-limiting examples of content include messages, entertainment programming, and/or informational programming available over any type of applicable medium, including, but not limited to, television, radio, and electronic communication media (for example, Internet web sites, software applications, including mobile applications, "mobile apps" or "apps").

A recipient may generally include any physical device or definable element capable of receiving content through a network or other communication system, such as a cable television network, satellite television network, the Internet, an intranet, a LAN, a WAN, computing device advertising systems (e.g., advertisements, such as banner advertisements, provided through mobile device applications), or combinations thereof. Television networks may include standard definition (SD) and high definition (HD) networks. A physical device may include any end-point of media transmission, including a computing device (e.g., a personal computer (PC), laptop computer, and/or mobile computing device, including, without limitation, smart phones, personal digital assistants (PDAs), and tablet computing devices), SD and HD televisions, set-top-boxes, and combinations thereof. Definable elements may include, but are not limited to, ad-insertion zones, physical regions, programs, periods of the day, real-time conditionals, and combinations thereof.

According to embodiments, the content optimization system may be configured to operate across physical device platforms and networks simultaneously. For example, a particular content campaign, such as an advertising campaign, may be managed by the content optimization system to set-top-boxes over a cable television system, to mobile computing devices using standard network communication protocols (for instance, Ethernet or Wi-Fi) over an Internet service provider network, and to smart phone devices over standard telecommunication protocols (for instance, third Generation (3G), fourth Generation (4G), long-term evolution (LTE), or the like).

Content may generally include any type of data capable of being received and consumed by a recipient. Illustrative and non-restrictive examples of content include advertising, entertainment programs, informational programs, comprising video, audio, graphical, and/or animated content.

Inventory may generally include a universe of available recipients at one or more particular times. In an embodiment, inventory may comprise a plurality of inventory slots, with each slot including one or more targets at a particular time. For example, an inventory slot may comprise a set of set-top-boxes within a cable network during prime time viewing hours on a particular television channel. Each inventory slot may be associated with a value or price indicating the cost associated with placing content therein.

According to some embodiments, the content optimization system may be configured to optimize the placement of content within the universe of inventory. Optimization may be configured according to various system users. For example, a cable network user may have a particular set of goals that may be different or partially different than the goals of an advertiser user. The cable network user may have goals directed toward, among other things, maximizing advertising revenue from advertisers placing advertising content in available inventory slots as well as meeting their own internal advertising goals with the least valuable inventory, for instance, in order to preserve higher value inventory for generating revenue. The advertiser user may have goals directed toward reaching content characteristics, such as certain demographic targets, within a budget within the time allotted for a particular advertising campaign.

According to some embodiments, the content optimization system may include processes such as the planning, buying, and allocation of content inventory, including supporting and/or facilitating all or some of these processes. For instance, all or part of a media plan may be optimized automatically, with or without manual optimizations, and the optimization results displayed in a quantifiable manner using terms, numbers, and/or graphical representations. Embodiments provide that the content optimization system may be configured to provide for the planning, buying and allocation of content and/or inventory over multiple heterogeneous systems including cable television network, satellite television network, Internet service provide network, telecommunications network (for example, 3G, 4G, LTE, or the like, mobile communication technologies) and any other type of system in existence now or in the future capable of providing content to targets.

Embodiments may be configured with demographic information associated with various elements used by the content optimization system, such as targets, networks and definable elements. In an embodiment, the demographic information may be associated with one or more content characteristics comprising intended demographics of the subject content. For example, if a particular content offering is intended for males between the ages of 18-25, then the content characteristics of the content offering may comprise segments and/or demographic vectors including this portion of the target population. Such information may be stored in any capable storage structure known to those having ordinary skill in the art, including databases, tables, logical storage devices, memory structures on a storage device, and the like. For example, the content optimization system may store, or may access to, a set of detailed demographic vectors (S) for each individual physical target (T), where each demographic vector (Si) represents a specific population segment. The population segments, may include, for example and without limitation, income level, gender, number of residents in a household, age ranges, employment, education levels, real-time conditionals (for example, weather, news, stock markets, and the like) or any other definable demographic. In one embodiment, demographic vector data may be obtained in real-time from third-party sources, such as wire services, news outlets, Internet sites, web pages, or other service providers.

A demographic vector may be configured to include an index representing a specific value, or attribute score, within a segment. For instance, income ranges such as: "less-than $40 k", "$40 k-$60 k", "$60 k-$80 k", "$80 k-$100 k", "greater-than $100 k." The values of the attribute scores within the vector may represent how the associated target (T) scores against these segment values. For example, an ad-insertion zone could have a vector for a "family size" segment configured as follows:

$$S_{0801,Family\_size}\begin{pmatrix} single\_no\_kids \\ single\_with\_kids \\ couple\_no\_kids \\ couple\_with\_kids \end{pmatrix} = \begin{pmatrix} 301 \\ 12 \\ 178 \\ 739 \end{pmatrix} \quad (1)$$

The family size vector may indicate the family size characteristics of particular zone. This illustrative family size vector indicates that this particular zone has a relatively high density of couples with children and a very low density of single parents with kids. The values of the vector may be indexed according to various methods. In the illustrative family size vector, the values are indexed from 0 to 1000. In another example, a physical target may represent a particular household that may be associated with a "car propensity" vector indicating the propensity to purchase a particular type of automobile:

$$S_{X,Propensity\_Car}\begin{pmatrix} sedan \\ sports \\ minivan \\ SUV \\ truck \end{pmatrix} = \begin{pmatrix} 221 \\ 98 \\ 897 \\ 556 \\ 131 \end{pmatrix} \quad (2)$$

The illustrative "car propensity" vector may indicate that the household is likely to buy a minivan or an SUV with a much smaller likelihood of purchasing a sports car or truck.

The content optimization system may be configured according to embodiments to store and/or access any number of such vectors associated with various recipients, including physical targets, zones, and the like. Each physical target may be associated with any number of demographic vectors. According to some embodiments, each vector may have a defined set of indices and a defined range of values. The values may be raw values, adjusted according to one more processes, such as normalization processes, or limited by certain constraints. For example, some example demographic vectors may comprise binary values. The following example shows a "number of children" vector for household X indicating the number of children in the household:

$$S_{X,Nr\_of\_Children}\begin{pmatrix} none \\ one \\ two \\ three \\ four+ \end{pmatrix} = \begin{pmatrix} 0 \\ 0 \\ 1 \\ 0 \\ 0 \end{pmatrix} \quad (3)$$

According to the "number of children" vector, household X has two (2) children. As the example illustrates, there may be restrictions to the values a vector may take. In this embodiment, because the household cannot have two discrete numbers representing the number of children in the household, only value for the number of children can be one (1), while the others must be zero (0). Accordingly, the values for the "number of children" vector always add up to 1.

According to some embodiments, the content optimization system may comprise a physical universe (U) that comprises a number of physical targets (T), which may be expressed as follows:

$$U = \sum_i T_i \qquad (4)$$

Where every target may be defined by a set of vectors (S):

$$T_i = \sum_j S_{i,j} \qquad (5)$$

Where each vector (S) may define scores against segmentation values:

$$S_{i,j} = \begin{pmatrix} x_1 \\ x_2 \\ x_3 \\ ... \\ x_n \end{pmatrix} \qquad (6)$$

Each of the demographic vectors may be summed, multiplied, combined, or optimized in any manner capable of determining the most effective media content for each individual defined target. The rotations of media content distributed over the universe may then be customized, by target, zone, time period, or any other definable entity to generate the most effective results.

Embodiments provide for a content optimization system configured to access and/or provide for the configuration of a media plan, campaign, or other definable content presentation. A campaign may generally refer to a series of content presentations (e.g., "creatives") generally related by a common idea or theme. An illustrative campaign is an advertising campaign comprising various advertisements involving a common product or service. Advertisers may have several campaigns running simultaneously. Each campaign is often multiple weeks in length, for which advertisers' creatives, targeting, and daily budget often change. A media buyer may purchase a large set of inventory (e.g., time slots on a television station, display elements, such as a banner advertisement, on a web page, etc.) and decide how to map all of the campaign content product onto the purchased inventory, for example, based on viewer data, budget allocation, and the like.

For example, a media plan may cover multiple brands, or products, each of which may have a distinct target demographic, budgets and reach goals. Reach may generally refer to the number, or percentage, of the target demographic group that will be exposed to the content, media plan, and the like. Each brand may have a set of target demographics associated with it. According to some embodiments, the content optimization system, along with the individual content providers, may enter and store such demographics. Embodiments provide that the demographics may be configured according to provide various levels of detail and. For example a target demographic may be defined as "males 18-25" instead of the more generic "males 18-45," which is a typical demographic used in the television industry.

The content optimization system may be configured according to some embodiments to allow for the configuration of one or more goals and/or sets of goals. Goals may be configured according to various methods and may be directed toward one or more different objectives. For instance, goals may be set in terms of many parameters including, but not limited to, budget per product/brand, desired reach, flight (for example, the dates when the media plan is scheduled to be active), frequency (for example, the average number of times a target is exposed to the media plan), or a frequency cap (for example, an upper bound on the frequency).

In an embodiment, a goal may be at least partially defined by a cost-per-mille (CPM) parameter, which may generally refer to the cost of reaching absolute numbers of viewers. For instance, CPM may be configured as the cost to reach 1000 people. Similarly, a targeted CPM (TCPM) parameter may be configured as the cost to reach 1000 people in a target recipient population. TCPM may be calculated as TCPM=CPM/"fraction," where "fraction" represents the fraction of the total universe that is actually in the target recipient population. In a non-limiting example where the target recipient population is males, if the CPM for a particular media plan is $50 and half of the viewers are male (fraction=0.5), then the TCPM may be determined by the following: $100 (=$50/0.5).

In another embodiment, a goal may be at least partially defined by a rating points parameter. A rating point may generally refer to one percentage point of the target demographic. For example, if a media plan is targeted at males, and the media plan consists of 10 insertions into programs that each have a rating of 5 for males (for instance, meaning that an average of 5% of the male population will watch these programs), then this plan may deliver 50 (=10×5) gross rating points (GRPs).

In a further embodiment, a goal may be at least partially defined by a cost-per-point (CPP) parameter, which may generally refer to the cost to deliver one rating point. For instance, a media plan costing $10,000 to deliver 50 rating points would have a CPP of $200 according to the following: $10,000/50=$200. According to some embodiments, ratings may be dependent on various factors, including, without limitation, programs and parts of the day, such as morning news (5:00 am-9:00 am), evening news, primetime, and/or other definable periods. Such parameters are not exhaustive, and any other quantifiable parameters may be used.

The content optimization system may be configured according to embodiments to optimize one or more media plans and/or various aspects thereof. For instance, the content optimization system may use the difference in demographic vectors per zone, or other physical targets, described above, to calculate the optimal rotation as to that zone driven by the goals of the media plan. In an embodiment, the content optimization system may perform optimization automatically, for example, as soon as the targeting screens are initially opened, or when a user selects an "Auto-Optimization" button, and/or any other method configured to trigger optimization. In addition, example systems may allow users to view optimized media placements. In this manner, a user, such as an advertiser, may manually modify, override or otherwise refine media placements or aspects thereof.

Embodiments provide that the content optimization system may automatically and dynamically optimize placements based on any number of defined goals, such as the goals and related parameters described above. For instance, the content optimization system may be configured to optimize placement according to reach, CPM, TCPM, and combinations thereof. In addition, the content optimization system may allow for optimization based on multiple parameters at once. For instance, the content optimization system may be configured to optimize placement based on reach, but may do so only with a defined budget goal. Thus, the content optimization system may attempt to come as close as possible to maximizing reach, while not exceeding the limit set by the budget goal. Any combination of parameters may be used to guide optimization, and multiple parameters may be combined in any logical manner according to any reasonable formula or set of priorities.

In an embodiment, the targeting universe may be divided into zones, with each zone being associated with one or more vectors. For example, a zone may be associated with a defined, fixed set of vectors in which definitions and data are preloaded from one or more data sources. The content optimization system may be configured with one or more media plans, including preloaded fixed media plans, variable plans, user-configured plans, and combinations thereof. All data may be aggregated data at the zone level. The content optimization system may allow users to configure multiple advertisers with one spot each, or one advertiser with multiple products/brands with one spot per product/brand. In addition, the optimization goals may be configured in terms of budgets per client/product in combination with other goals, such as reach. Accordingly, the content optimization system may maximize reach (i.e., come as close as possible to all goals) against fixed budgets.

According to some embodiments, the content optimization system may provide user interfaces configured to present aspects of placing content within the universe of inventory. For instance, a user interface may be configured to present various information associated with the content, including, but not limited to, the CPM, TCPM, or other target value, at any given time, providing instant feedback on the value that is being added by the optimization system. Such information may be presented for each content offering, such as an entertainment program, informational program, and/or advertisement, including for each spot, product, brand, and the like for each advertisement.

FIG. 1 depicts an illustrative user interface for associating spots with particular demographic groups according to some embodiments. As shown in FIG. 1, the user interface 100 may display the spots 105 which have been defined as well as a number of target demographic groups 110 that may be associated with the spots. The demographic groups 110 may be represented by labels which may more specifically define each demographic group (for example, income less-than $50,000, income less-than $100,000, gender, age range, and the like). The user interface 100 may allow a user to build associations between the spots 105 and target demographics 110 by a graphical user interface element 115, such as check box.

Figure 2:
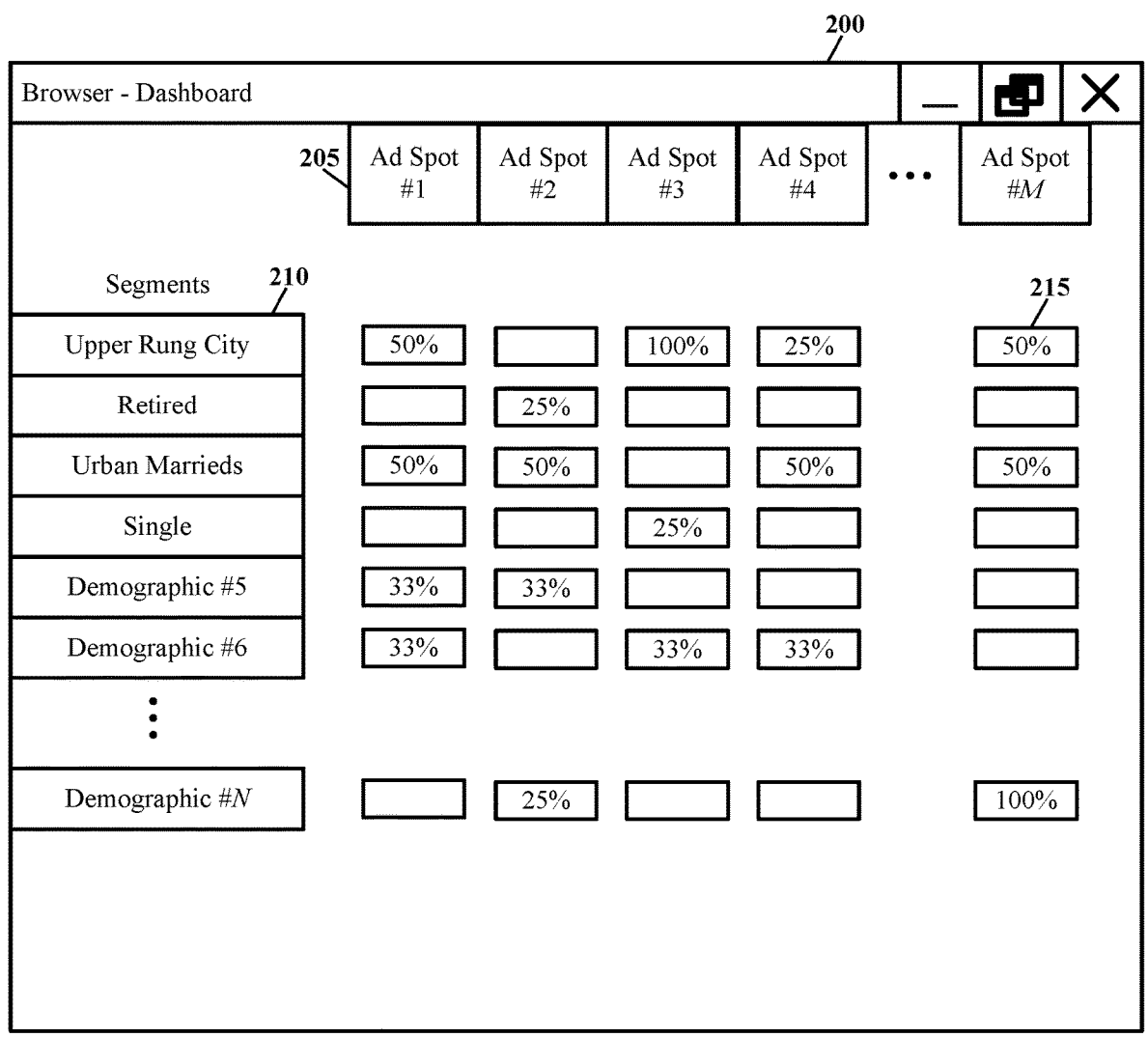
FIG. 2 depicts an illustrative user interface for presenting content rotations for certain demographics according to some embodiments.

FIG. 2 depicts an illustrative user interface for presenting content rotations for certain demographics according to some embodiments. As shown in FIG. 2, a user interface 200 may present information associated with advertisement spots 205 and demographic groups 210. The user interface 200 provides percentages 215 representing how each spot may be placed within a particular demographic group 210. For instance, two spots target the "Urban Marrieds" group equally in the example.

Figure 3:
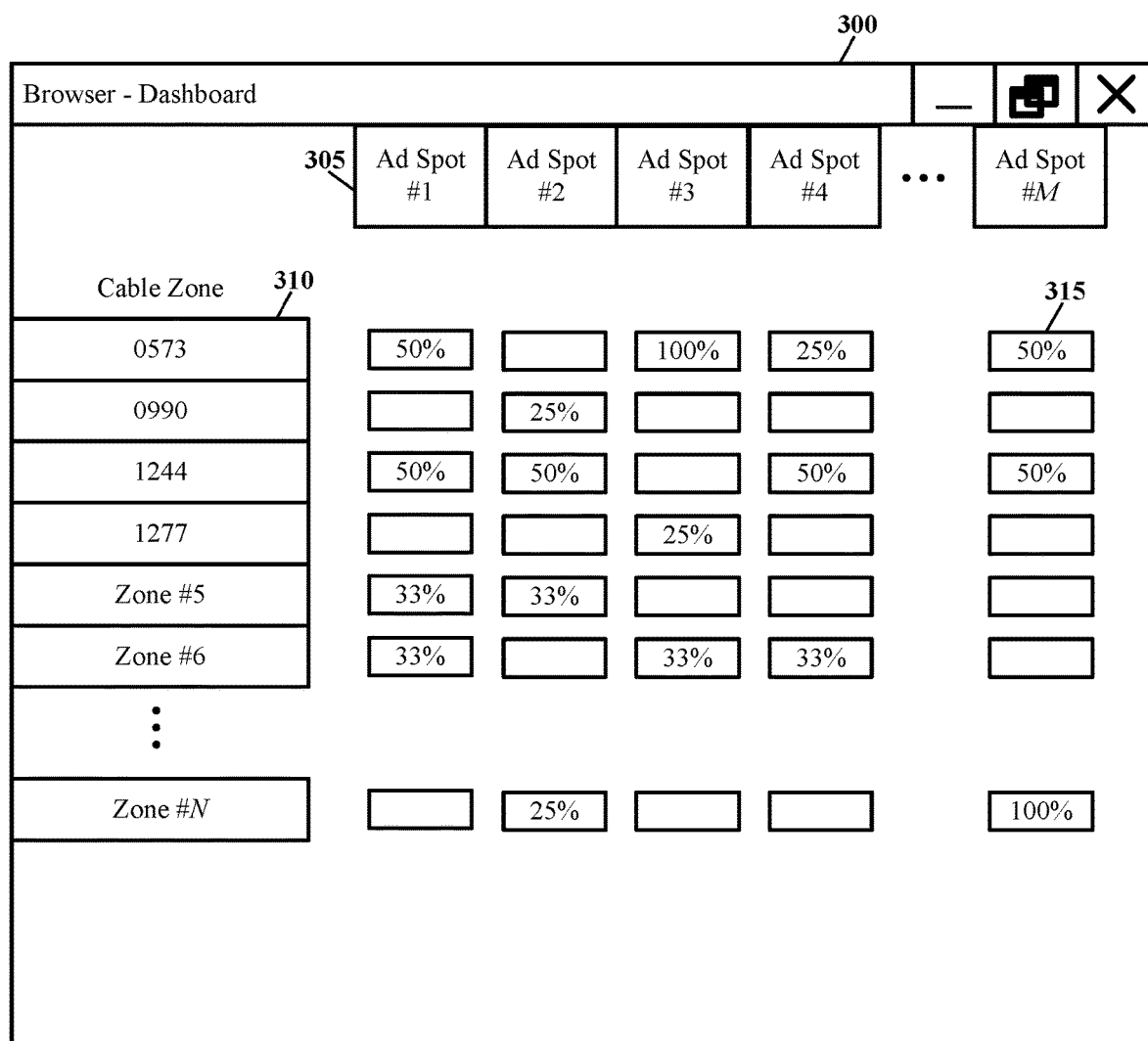
FIG. 3 depicts an illustrative user interface for presenting spots within different zones according to some embodiments.

FIG. 3 depicts an illustrative user interface for presenting spots within different zones according to some embodiments. As shown in FIG. 3, a user interface 300 may be configured to present a number of spots 305 divided over one or more zones 310 in a network, such as a cable television network. According to some embodiments, the spots 305 may be divided over the physical zones 310 to which the advertisements are targeted, as represented by the percentages 315 associated with each spot for each physical zone.

Figure 4:
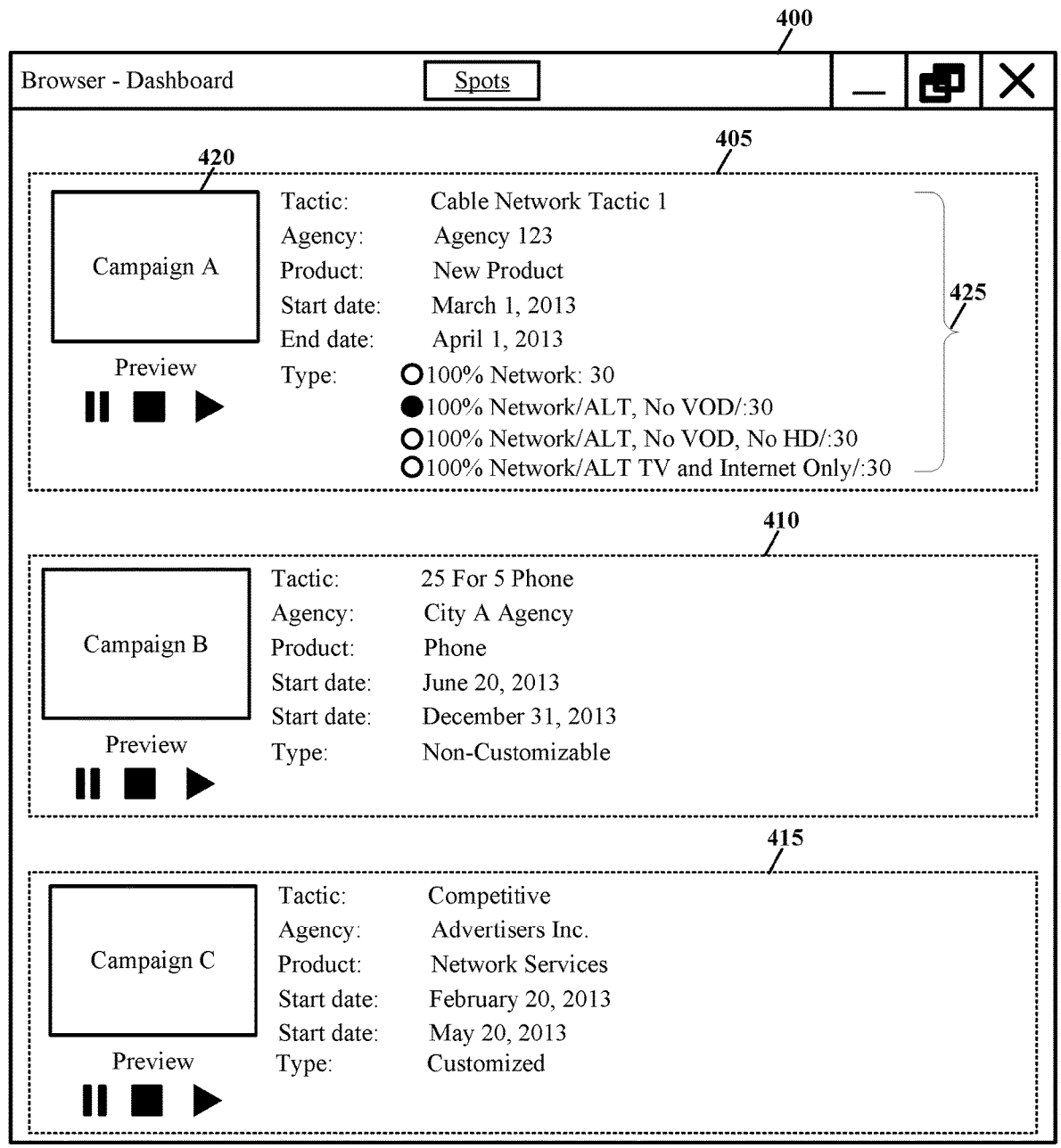
FIG. 4 depicts an illustrative user interface for configuring certain aspects of a campaign according to a first embodiment.

FIG. 4 depicts an illustrative user interface for configuring certain aspects of a campaign according to a first embodiment. As shown in FIG. 4, a user interface 400 may be configured to present one or more campaigns 405, 410, 415 to a user. Each campaign 405, 410, 415 may comprise campaign content 420, such as an advertising video. One or more campaign characteristics 425 may be associated with each campaign, including, without limitation, a campaign tactic, advertising agency, campaign product, start and end dates, and a campaign type. Through the user interface 400, a user may, among other actions, access one or more one or more campaigns 405, 410, 415, review campaign information, and/or configure campaign properties, such as select the campaign type.

Figure 5:
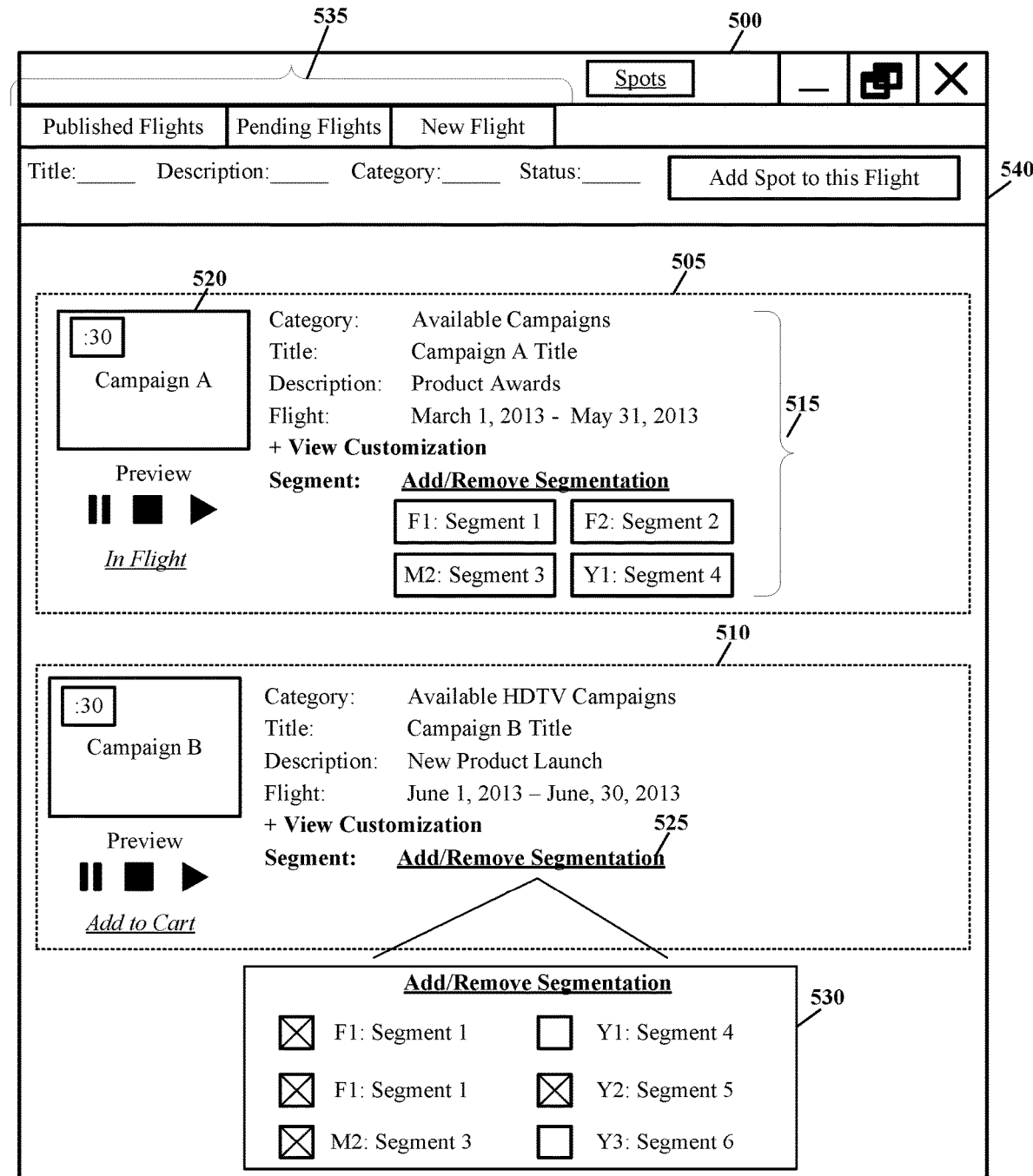
FIG. 5 depicts an illustrative user interface for configuring certain aspects of a campaign according to a second embodiment.

FIG. 5 depicts an illustrative user interface for configuring certain aspects of a campaign according to a second embodiment. As shown in FIG. 5, a user interface 500 may be configured to present one or more campaigns 505, 510 to a user. Each campaign 505, 510, may comprise campaign content 520, such as a multimedia presentation of a specified duration (for example, a standard 30 second time slot). One or more campaign characteristics 515 may be associated with each campaign, including, without limitation, a category, a title, a description, a flight duration, and/or campaign customization. A user interface element may be provided to allow a user to add/remove segmentation 525 information associated with the campaign and/or a specific spot. Selection of the add/remove segmentation 525 element may cause an add/remove segmentation window 530 to be displayed for adding and/or removing segments. From the user interface 500, a user may select to view flights using one or more flight selection 535 elements. For instance, a user may select to view published flights, pending flights, and/or add a new flight. Selection to add a new flight may operate to generate new flight configuration 540 elements for setting up a new flight, including, without limitation, a tile, description, category, status, number of flights, number of markets, and/or a selection element to add the newly configured flight.

Figure 6:
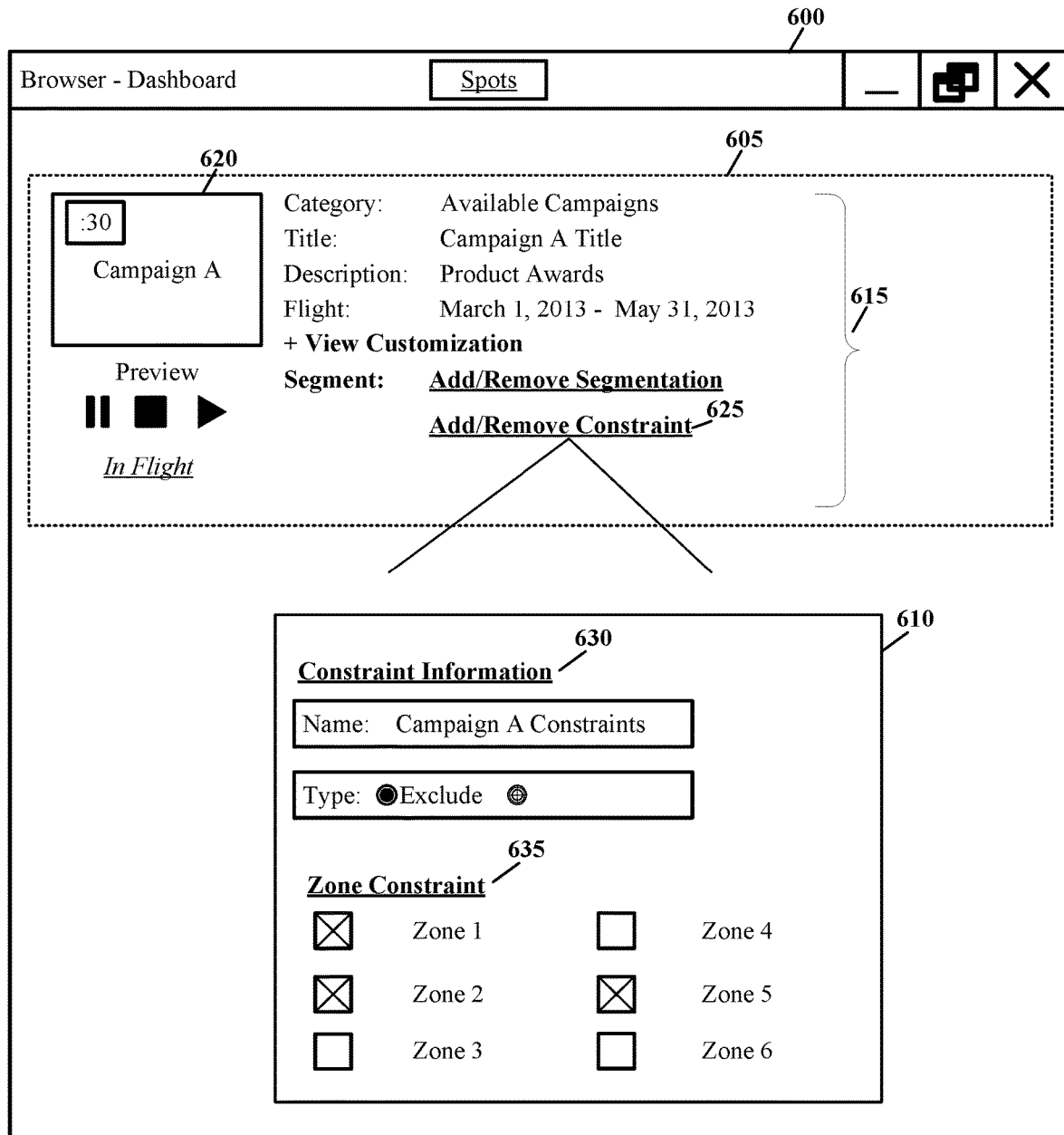
FIG. 6 depicts an illustrative user interface for configuring certain aspects of a campaign according to a third embodiment.

FIG. 6 depicts an illustrative user interface for configuring certain aspects of a campaign according to a third embodiment. As shown in FIG. 6, a user interface 600 may be configured to present at least one campaign 605 to a user. The campaign 605 may comprise campaign content 620 and one or more campaign characteristics 515, such as a category, a title, a description, a flight duration, an add/remove segment element, and/or an add/remove constraint element 625. Selection of the add/remove constraint 625 element may cause an add/remove constraint window 610 to be displayed for adding and/or removing constraints. The add/remove constraint window 610 may provide graphical elements for specifying constraint information 630 and/or for selecting constraints 635, such as zone constraints.

Figure 7:
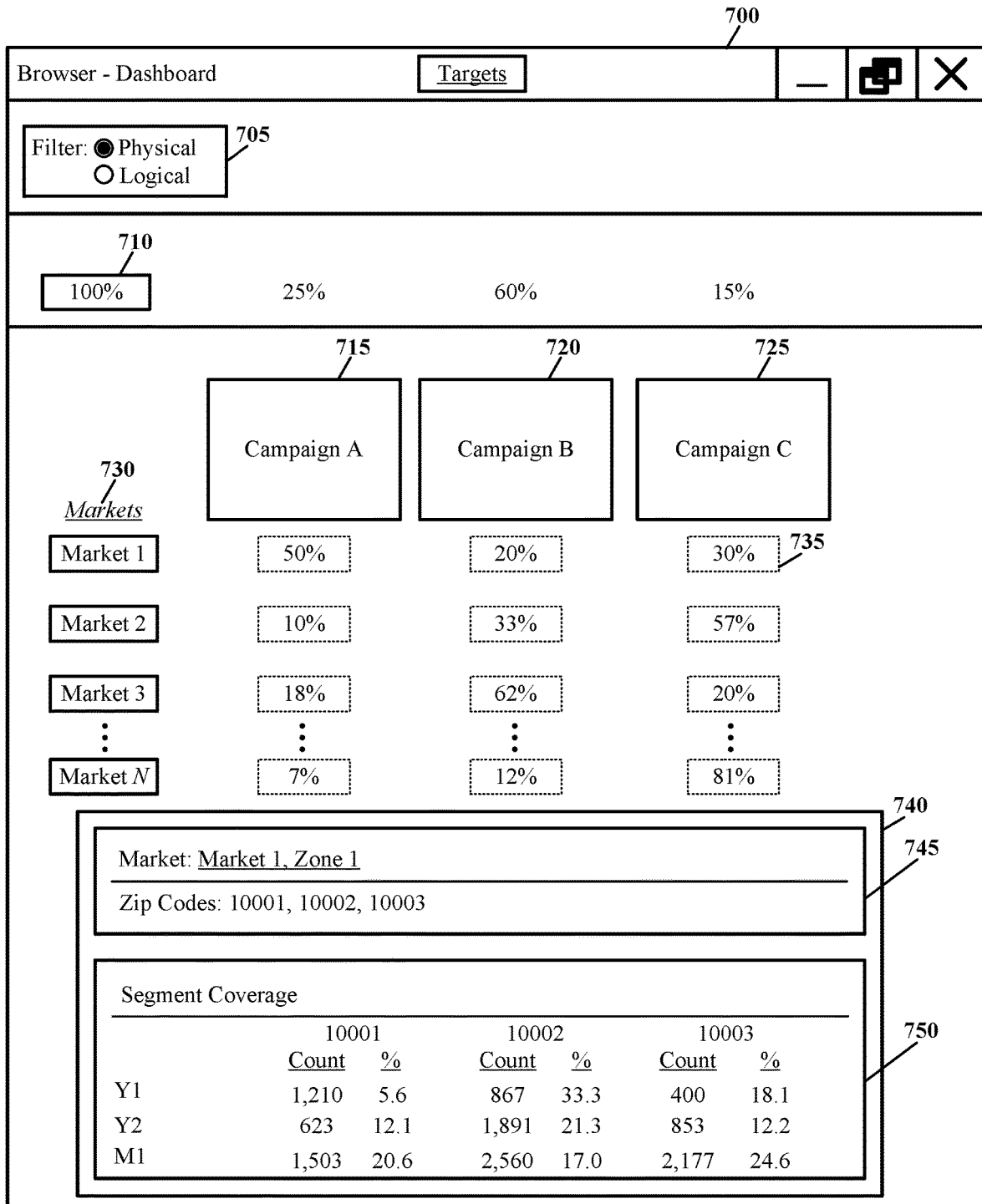
FIG. 7 depicts an illustrative user interface for displaying information associated with a campaign according to an embodiment.

FIG. 7 depicts an illustrative user interface for displaying information associated with a campaign according to an embodiment. As shown in FIG. 7, a user interface 700 may be configured for displaying one or more campaigns 715, 720, 725 and markets 730 where the campaigns may be operating. The information displayed through the user interface 700 may be filtered 705 using various filtering options, such as filtering for physical or logical targets, markets, campaigns, types of targets, or the like. Aggregate data 710 for the campaigns 715, 720, 725 may be displayed on the user interface 700 showing the percentages of each campaign as a portion of 100% of a campaign. In addition, campaign data 735 may be displayed for each campaign, for example, as a percentage of each campaign 715, 720, 725 for each market 730.

According to some embodiments, selection of a particular market 730 may cause a market detail window 740 to be displayed. The market detail window 740 may provide detailed information about the market, such as the components of the market 745, such as zip codes, maps, population data, and any other pertinent data associated with the market. The market detail window 740 may also provide information associated with the segment coverage 750 of a particular campaign or campaigns 715, 720, 725.

According to some embodiments, the information provided through the user interface 700 may comprise information in various states, such as historical data, substantially real-time data, and/or projected data. For example, a user may access the user interface 700 to obtain viewing data and/or to ascertain the progress of a campaign in reaching the objectives thereof.

Figure 8:
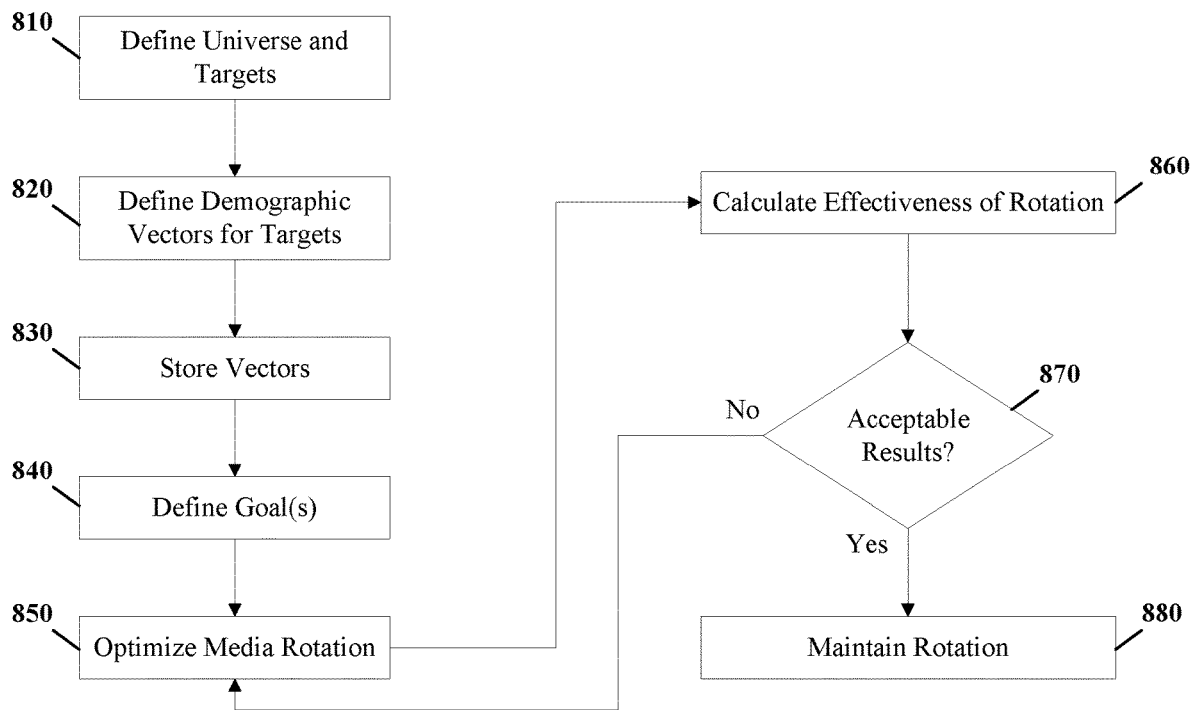
FIG. 8 depicts an illustrative flow diagram for a method of optimizing distribution of targeted media rotations according to some embodiments.

FIG. 8 depicts an illustrative flow diagram for a method of optimizing distribution of targeted media rotations according to some embodiments. As shown in FIG. 8, a universe may be defined 810, for example, a universe comprised of media targets. For each media target, demographic vectors may be defined 820, as described above, and stored 830 in one or more storage locations, such as databases, tables, and/or other electronic storage elements. A goal may be defined 840 reflecting the success of the targeted media distribution. The content optimization system may optimize the rotation of targeted media 850 content based on the various factors, including, without limitation, demographic vectors, the goal of the targeted rotation, resource constraints, inventory value, filtering rules, viewer data, or combinations thereof. The effectiveness of the rotation may be calculated 860. If the effectiveness of the rotation meets or exceeds the goal 870, the rotation may be kept in place. If the results of the rotation are unacceptable, the rotation may be re-optimized 850 to provide better results and the effectiveness re-calculated 860.

According to some embodiments, content spots may be dynamically allocated based on feedback and resource constraints. In a non-limiting example involving advertising content, the content optimization system may be configured to optimally allocate advertising spots to maximize advertising sales revenue while meeting advertising goals under certain resource constraints. The amount of revenue brought in from outside sales of advertising inventory may depend on the networks and times for which the sold advertisements will play. In general, there may be a trade-off between inventory use for internal marketing, for example, by a cable television system provider, and outside advertising sales. Embodiments may be configured to provide an increase in the amount of valuable inventory that may be used for advertising sales while considering marketing reach constraints as well as other resource constraints, such as those related to the network provider's capacity to deliver addressable advertising.

According to some embodiments, the content optimization system may comprise an allocation model including allocation information associated with the distribution of content within the universe of inventory, including targets and definable elements, such as particular time slots during particular time segments, programming, and the like. A feedback loop may access viewing data and operate to update the allocation model based on changes in the viewing data. For instance, the feedback loop may update the allocation model as to the progress of advertising campaigns toward their segment reach goals.

The content optimization system may be configured to manage network or other communication system internal marketing and to balance internal marketing goals with revenue objectives associated with inventory sales to outside entities, such as content service providers and advertisers. For example, a cable television network may have an internal advertising campaign consisting of content marketing their services as part of a campaign to retain subscribers, generate subscription packages, and to obtain new subscribers. The cable television network may want to achieve its own marketing campaign goals (for example, reach and CPM goals), but not at the expense of advertising revenue. In another example, a television channel transmitted through a satellite television network may have an internal advertising campaign promoting one or more programs broadcast over the network. According to embodiments, the internal cable marketing spots may be allocated in such a way as to hit reach the campaign as efficiently as possible while leaving higher value inventory for advertising sales.

The content optimization system may be configured according to embodiments to model the value of inventory based on network/time considerations combined with the value of the resource available at that time. For example, if video-on-demand (VOD) content consumes more resources on a particular night, resources at that time may be valued at a premium. In another example, if advertiser demand for a resource at a given time is high, the value of that resource will also be high.

In an embodiment, one or more resource constraints may be used by the content optimization system to manage resources within the universe of inventory. A resource constraint may comprise any type of restriction, limitation, or the like, that affects the placement of content in an inventory slot. Non-limiting examples of constraints include technological constraints (for instance, bandwidth, technological capabilities of target devices, networks, only a certain number of addressable content offerings may be presented at a given time due to bandwidth limitations, or the like), zone constraints, monetary constraints (for example, inventory slots below a particular value), or the like. The resource constraints may be balanced against the value of the segments being targeted.

The content optimization system may access viewing data in real-time, substantially real-time, and/or based on historical data. The viewing data may comprise information associated with recipients, content, goals, impressions, or combinations thereof. For example, the viewing data may indicate how many recipients viewed or otherwise interacted with content, such as viewing an advertisement or viewing a television program in which an inventory slot was sold for a particular advertisement. In another example, the viewing data may operate to confirm the number of impressions by segment to assess progress toward reach goals for one or more content offerings. The viewing data may be obtained individually and/or simultaneously from various sources from within different zones, including, without limitation, set-top-boxes, televisions, satellite radio devices, computing devices (for example, personal computers, laptops, tablet computing devices, personal digital assistants (PDAs), smart phones, or the like), network equipment (for example, data servers, routers, switches, or the like), and combinations thereof.

Marketing campaigns may operate for a predetermined amount of time and/or until one or more specific goals (for example, reach) have been accomplished. As the campaign is running, the viewing data may be retrieved on a regular basis. In an embodiment, the viewing data may provide information associated with the progress and/or success that have been made toward one or more goals. The content optimization system may access one or more filtering rules configured to filter the viewing data to ensure that the desired impressions are counted toward advertising goals.

In an embodiment, the viewing data may be used to re-optimize how content, such as advertisements, are allocated within the universe of inventory. In a non-limiting example, an advertising campaign involving multiple target segments. A first segment may have exceeded the assigned reach and frequency goals. Accordingly, the future inventory may be optimally and dynamically re-assigned to a second segment which is underperforming with regards to reach and frequency.

According to some embodiments, the content optimization system may function under various levels of addressability. For instance, content may be targeted to various levels, including, without limitation, a cable zone level, a household level, a device or class of device (for example, mobile devices), or combinations thereof. On a cable zone level, household specific viewing data and demographic data may be aggregated by segment type in order to optimize ad allocation as a rotation across zones, networks, and dayparts (for example, morning rush hour, evening rush hour, overnight, primetime, or the like). In an embodiment, optimization may comprise using incomplete information such as viewing data from a limited sample of set-top boxes, computing devices, radio receivers, or other recipients. The content optimization system may be configured to drive improvement in content allocation optimization through improving aggregation methods of the incomplete data. According to some embodiments, such aggregation methods may involve combining various data sources, including data from set-top boxes, demographic vectors, segments, or other available consumer data sources. The content optimization system may be configured according to embodiments to optimize allocations through the use of linear programming methods or through the use of a competitive economic model, for example, where content an content providers compete for the use of resources such as bandwidth, valuable inventory, and target recipients.

The allocation model may be re-optimized dynamically and automatically by the content optimization system according to the viewing data. For instance, the allocation model may be updated at regular intervals (for example, every half hour, hourly, daily, weekly, or the like) to re-optimize based on viewing data and/or to monitor the progress of a campaign. The content optimization system may provide an allocation model configured as an idealized schedule which allows an advertiser, including an internal marketer, to achieve their target audience as efficiently as possible while maximizing the potential for outside revenue, such as outside advertisers. Accordingly, embodiments may provide for the allocation of internal marketing spots as well as those of multiple outside advertisers, who also have reach goals for different segments of the viewing population.

According to some embodiments, both an internal marketing allocation model and an external marketing allocation model may be implemented simultaneously, for example, on a household addressability platform, where every set-top box may be targeted, or on a cable zone level, where each cable zone may be targeted. For each allocation model, there may be a feedback loop of viewing data to adjust spot allocation based on actual viewership as it relates to the intended reach goals.

Figure 9:
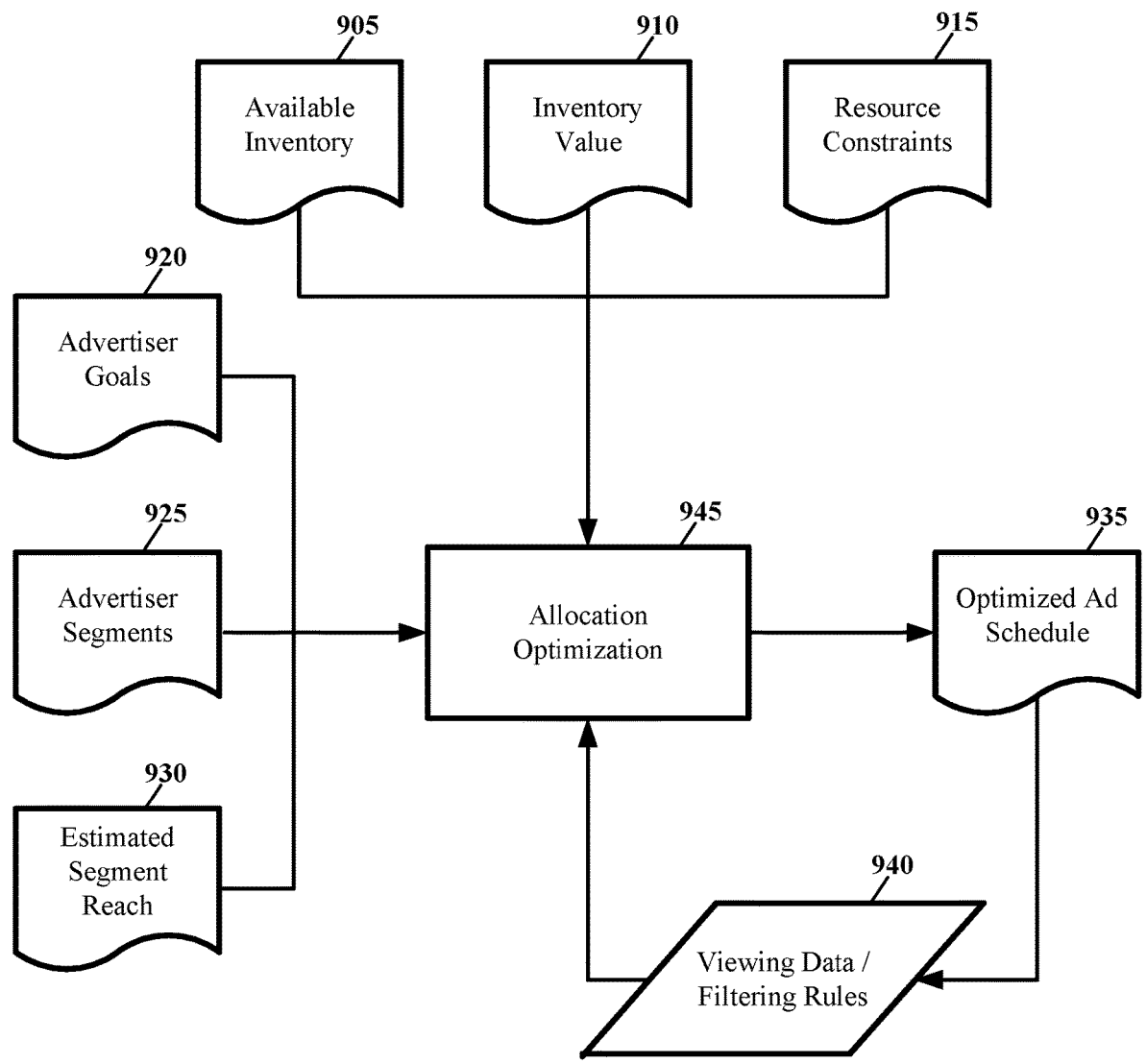
FIG. 9 depicts a flow diagram of a method for dynamically generating an allocation optimization model for advertising content according to some embodiments.

FIG. 9 depicts a flow diagram of a method for dynamically generating an allocation optimization model for advertising content according to some embodiments. As shown in FIG. 9, various data inputs may be used to generate an allocation optimization model 945 for one or more goals, such as maximizing advertising sales revenue, minimizing unused inventory slots, or the like. One set of data inputs may comprise an available inventory 905 input, an inventory value 910 input and a resource constraints 915 input. An available inventory 905 input may comprise inventory available for presenting content, such as the networks and times for which an advertisement may be presented to one or more targets. An inventory value 910 input may comprise the monetary value that a network operator may charge a content provide for the available inventory 905. A resource constraint 915 input may comprise the resource constraints associated with the inventory, such as a particular inventory slot, target, zone, or the like.

Another set of inputs may comprise an advertiser goals 920 input, an advertiser segments 925 input, and an estimated reach segment 930 input. The advertiser goals 920 input may comprise one or more particular goals associated with a particular advertisement, such as reach and frequency. A non-limiting example provides that advertiser goals 920 may include that a spot for a high speed Internet advertisement should reach 1,000,000 recipients with an average frequency of 7. An advertiser segments 925 input may comprise one or more segments and/or combinations of segments that are an intended target for the associated advertisement. For instance, an advertisement may be associated with segments in which the intended audience includes households with a household income of greater than $75,000/yr and a household age range 16-49). The estimated segment reach 930 input may comprise the number of household in the targeted segment that may see the advertisement during a specified network and/or time slot. According to some embodiments, the estimated segment reach 930 input may be based on various data sources, including, without limitation, ratings data, historical viewing data, third-party data, or combinations thereof.

As shown in FIG. 9, the allocation optimization model 945 may be used to generate an optimized advertising schedule 935. The optimized advertising schedule 935 may interact with one or more viewing data/filtering rules 940 to update and re-optimize the allocation optimization model 945. The viewing data/filtering rules 940 may include information associated with viewer impressions of the advertising and/or other content as well as a set of rules configured to filter advertisements, inventory slots, goals, or the like based on the viewing data. An illustrative and non-restrictive example provides that only impressions with a last user action within three hours counts toward the advertiser goals 920.

According to some embodiments, an optimization model may be run at the beginning of an advertising campaign to determine the best allocation of spots across multiple advertisers who may each have multiple spots with different goals. For instance, advertising spots may be allocated to maximize advertising inventory value for outside advertisers. As such, the allocation optimization model 945 may be configured to meet advertiser goals as well as satisfying the resource constraints 915 and other limitations based on additional inputs 905, 910, 920, 925, 930. As the advertising campaign progresses, the viewing data 940 may be used to update the allocation optimization model 945 and, therefore, generate an updated, re-optimized ad schedule 935.

In an embodiment in which at least one advertiser is an internal advertiser for the inventory provider, the allocation optimization model 945 may operate to meet the internal marketing advertising goals with the least valuable inventory in order to preserver higher value inventory for outside advertises for generating revenue. For example, then internal advertiser may comprise a satellite television provider seeking to advertise its services to subscribers. The satellite television provider may attempt to meet reach goals for the advertising by taking up a substantial portion of typically unused or low-value inventory slots and attempt to obtain reach goals through numerous, low-value presentations. In this manner, the satellite television provider may save higher value inventory slots for outside advertisers.

Figure 10:
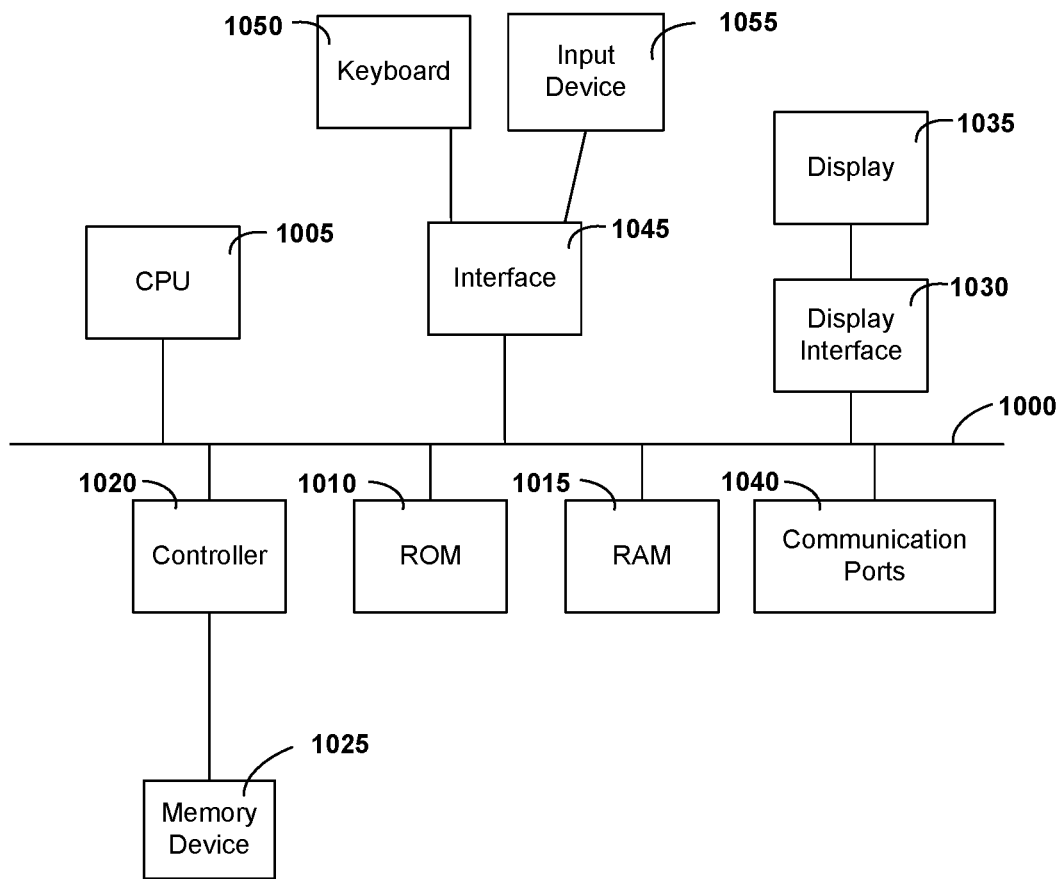
FIG. 10 depicts a block diagram of illustrative internal hardware that may be used to contain or implement program instructions according to an embodiment.

FIG. 10 depicts a block diagram of exemplary internal hardware that may be used to contain or implement program instructions, such as the modules and/or process steps discussed above in reference to FIGS. 8 and 9 and/or the user interfaces depicted in FIGS. 1-7, according to some embodiments. A bus 1000 serves as the main information highway interconnecting the other illustrated components of the hardware. CPU 1005 is the central processing unit of the system, performing calculations and logic operations required to execute a program. CPU 1005 is an exemplary processing device, computing device or processor as such terms are using in this disclosure. Read only memory (ROM) 1010 and random access memory (RAM) 1015 constitute exemplary memory devices.

A controller 1020 interfaces with one or more optional memory devices 1025 to the system bus 1000. These memory devices 1025 may include, for example, an external or internal DVD drive, a CD ROM drive, a hard drive, flash memory, a USB drive or the like. As indicated previously, these various drives and controllers are optional devices.

Program instructions, software or interactive modules for providing the digital marketplace and performing analysis on any received feedback may be stored in the ROM 1010 and/or the RAM 1015. Optionally, the program instructions may be stored on a tangible computer readable medium such as a compact disk, a digital disk, flash memory, a memory card, a USB drive, an optical disc storage medium, such as a Blu-ray™ disc, and/or other recording medium.

An optional display interface 1030 may permit information from the bus 1000 to be displayed on the display 1035 in audio, visual, graphic or alphanumeric format. Communication with external devices may occur using various communication ports 1040. An exemplary communication port 1040 may be attached to a communications network, such as the Internet or an intranet. Other exemplary communication ports 1040 may comprise a serial port, a RS-232 port, and a RS-485 port.

The hardware may also include an interface 1045 which allows for receipt of data from input devices such as a keyboard 1050 or other input device 1055 such as a mouse, a joystick, a touch screen, a remote control, a pointing device, a video input device, and/or an audio input device.

Computer program logic implementing all or part of the functionality previously described herein may be embodied in various forms, including, but in no way limited to, a source code form, a computer executable form, and various intermediate forms (for example, forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in a non-transitory form (for example, a source code form, a computer executable form, an intermediate form, or combinations thereof) in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink-wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

It will further be appreciated that the above-described methods and procedures may be provided using the systems disclosed herein, or on other types of systems. The methods and procedures, unless expressly limited, are not intended to be read to require particular actors or systems performing particular elements of the methods.

In the preceding specification, the present invention has been described with reference to specific example embodiments thereof. It will, however, be evident that various modifications and changes may be made thereunto without departing from the broader spirit and scope of the present invention. The description and drawings are accordingly to be regarded in an illustrative rather than restrictive sense.

What is claimed is:

1. A method comprising:
 receiving, from a first server, first information indicating:
  a first targeted number of impressions associated with first content to be distributed via a network, wherein the first content comprises advertising content associated with at least one outside advertiser, and
  a second targeted number of impressions of second content to be distributed via the network, wherein the second content comprises advertising content associated with the network;
 receiving, from a second server, second information associated with each of a plurality of computing devices;

determining, based on the second information, a first schedule for distributing the first content and the second content to the plurality of computing devices, wherein the first schedule is configured to first achieve the first targeted number of impressions and to then achieve the second targeted number of impressions;

transmitting, to the plurality of computing devices via the network and based on the first schedule, the first content and the second content;

receiving, via the network, third information associated with the first content and the second content; and determining, based on the third information, a second schedule for distributing the first content and the second content to the plurality of computing devices.

2. The method of claim 1, wherein the second information indicates ratings data.

3. The method of claim 1, wherein the third information indicates viewing data comprising impressions of the first content or the second content.

4. The method of claim 3, wherein the viewing data is filtered using at least one filtering rule based on a marketing campaign associated with the first content or the second content.

5. The method of claim 4, wherein the at least one filtering rule is configured to filter the viewing data to ensure that only desired impressions within the viewing data are counted toward the first targeted number of impressions or the second targeted number of impressions.

6. The method of claim 1, wherein the first schedule is further based on at least one resource constraint.

7. The method of claim 6, wherein the at least one resource constraint comprises at least one of a bandwidth limitation, a monetary constraint comprising a time slot value threshold, or an advertising insertion distribution zone constraint.

8. The method of claim 1, wherein the first targeted number of impressions is achieved by scheduling, for the first content, one or more time slots of a plurality of time slots with higher ratings data values than other time slots of the plurality of time slots.

9. The method of claim 1, wherein at least one computing device of the plurality of computing devices is a set-top-box or a mobile computing device.

10. A device comprising:
one or more processors; and
memory storing instructions that, when executed by the one or more processors, cause the device to:
receive, from a first server, first information indicating:
a first targeted number of impressions associated with first content to be distributed via a network, wherein the first content comprises advertising content associated with at least one outside advertiser, and
a second targeted number of impressions of second content to be distributed via the network, wherein the second content comprises advertising content associated with the network;
receive, from a second server, second information associated with each of a plurality of computing devices;
determine, based on the second information, a first schedule for distributing the first content and the second content to the plurality of computing devices, wherein the first schedule is configured to first achieve the first targeted number of impressions and to then achieve the second targeted number of impressions;

transmit, to the plurality of computing devices via the network and based on the first schedule, the first content and the second content;

receive, via the network, third information associated with the first content and the second content; and determine, based on the third information, a second schedule for distributing the first content and the second content to the plurality of computing devices.

11. The device of claim 10, wherein the second information indicates ratings data.

12. The device of claim 10, wherein the third information indicates viewing data comprising impressions of the first content or the second content.

13. The device of claim 12, wherein the viewing data is filtered using at least one filtering rule based on a marketing campaign associated with the first content or the second content.

14. The device of claim 13, wherein the at least one filtering rule is configured to filter the viewing data to ensure that only desired impressions within the viewing data are counted toward the first targeted number of impressions or the second targeted number of impressions.

15. The device of claim 10, wherein the first schedule is further based on at least one resource constraint.

16. The device of claim 15, wherein the at least one resource constraint comprises at least one of a bandwidth limitation, a monetary constraint comprising a time slot value threshold, or an advertising insertion distribution zone constraint.

17. The device of claim 10, wherein the first targeted number of impressions is achieved by scheduling, for the first content, one or more time slots of a plurality of time slots with higher ratings data values than other time slots of the plurality of time slots.

18. The device of claim 10, wherein at least one computing device of the plurality of computing devices is a set-top-box or a mobile computing device.

19. A method comprising:
receiving, from a first server, first information indicating:
a first targeted number of impressions associated with first content to be distributed via a network, wherein the first content comprises advertising content associated with at least one outside advertiser, and
a second targeted number of impressions of second content to be distributed via the network, wherein the second content comprises advertising content associated with the network;

determining, based on second information indicating ratings data for a plurality of time slots, a first schedule for distributing the first content and the second content to a plurality of computing devices, wherein the first schedule is configured to first achieve the first targeted number of impressions and to then achieve the second targeted number of impressions;

transmitting, to the plurality of computing devices via the network and based on the first schedule, the first content and the second content.

20. The method of claim 19, wherein the first targeted number of impressions is achieved by scheduling, for the first content, one or more time slots of the plurality of time slots with higher ratings data values than other time slots of the plurality of time slots.

* * * * *